(12) United States Patent
Shi

(10) Patent No.: US 8,392,858 B2  
(45) Date of Patent: Mar. 5, 2013

(54) DETECTION AND REMOVAL OF HAZARDS DURING OPTIMIZATION OF LOGIC CIRCUITS

(75) Inventor: Feng Shi, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 320 days.

(21) Appl. No.: 12/399,119

(22) Filed: Mar. 6, 2009

(65) Prior Publication Data

US 2010/0229143 A1 Sep. 9, 2010

(51) Int. Cl.  
*G06F 17/50* (2006.01)

(52) U.S. Cl. ..................................... 716/106

(58) Field of Classification Search ........... 716/100–139  
See application file for complete search history.

(56) References Cited

U.S. PATENT DOCUMENTS

| | | | |
|---|---|---|---|
| 6,324,679 B1 * | 11/2001 | Raghunathan et al. | 716/133 |
| 7,299,436 B2 | 11/2007 | Chu et al. | |
| 2006/0051680 A1 * | 3/2006 | Tritchkov et al. | 430/5 |
| 2009/0172612 A1 * | 7/2009 | Kanamaru | 716/4 |

OTHER PUBLICATIONS

Siegel, et al., "Automatic Technology Mapping for Generalized Fundamental-Mode Asynchronous Designs", Design Automation, 1993. 30th Conference on , vol., no., pp. 61-67, Jun. 14-18, 1993.*

Scott Hauck, "Asynchronous Design Methodologies: An Overview," Proceedings of the IEEE, vol. 83, No. 1, Jan. 1995. pp. 69-93.

Polly Siegel, et al., "Automatic Technology Mapping for Generalized Fundamental-Mode Asynchronous Designs," Computer Systems Laboratory Departments of Electrical Engineering and Computer Science Stanford University, Technical Report: CSL-TR-93-580, Jun. 1993, (26 pages).

Robert M. Fuhrer, et al., "Symbolic Hazard-Free Minimization and Encoding of Asynchronous Finite State Machines," Proc. International Conf. Computer-Aided Design (ICCAD), 1995, (8 pages).

Steven M. Nowick, et al., "Exact Two-Level Minimization of Hazard-Free Logic with Multiple-Input Changes," IEEE Transactions on Computer-Aided Design of Integrated Circuits and Systems, vol. 14, No. 8, Aug. 1995, pp. 986-997.

Rahul Balani, "Synthesis of Hazard Free Asynchronous Circuits from Signal Transition Graphs," B. Tech. Seminar Report, Department of Computer Science and Engineering Indian Institute of Technology, Bombay Mumbai, (24 pages).

Polly Siegel, et al., "Automatic Technology Mapping for Generalized Fundamental-Mode Asynchronous Designs," Annual ACM IEEE Design Automation Conference, Proceedings of the 30th international conference on Design automation, Dallas, Texas, 1993 pp. 61-67.

Al Davis, et al., "An Introduction to Asynchronous Circuit Design," UUCS-97-013, Sep. 19, 1997 (58 pages).

* cited by examiner

Primary Examiner — Vuthe Siek  
Assistant Examiner — Aric Lin  
(74) Attorney, Agent, or Firm — Weide & Miller, Ltd.

(57) ABSTRACT

A method of generating a hazard-free representation of a logic circuit that can leverage the powerful and mature synchronous-circuit CAD synthesis tools. In a representative embodiment of the method, an initial representation of a specified asynchronous logic circuit is synthesized using one of such CAD tools. The initial representation is then analyzed to identify hazardous transitions and modified, e.g., by iteratively inserting additional logic aimed at preventing the identified hazardous transitions from producing glitches, until a hazard-free representation of the specified asynchronous logic circuit is produced.

45 Claims, 5 Drawing Sheets

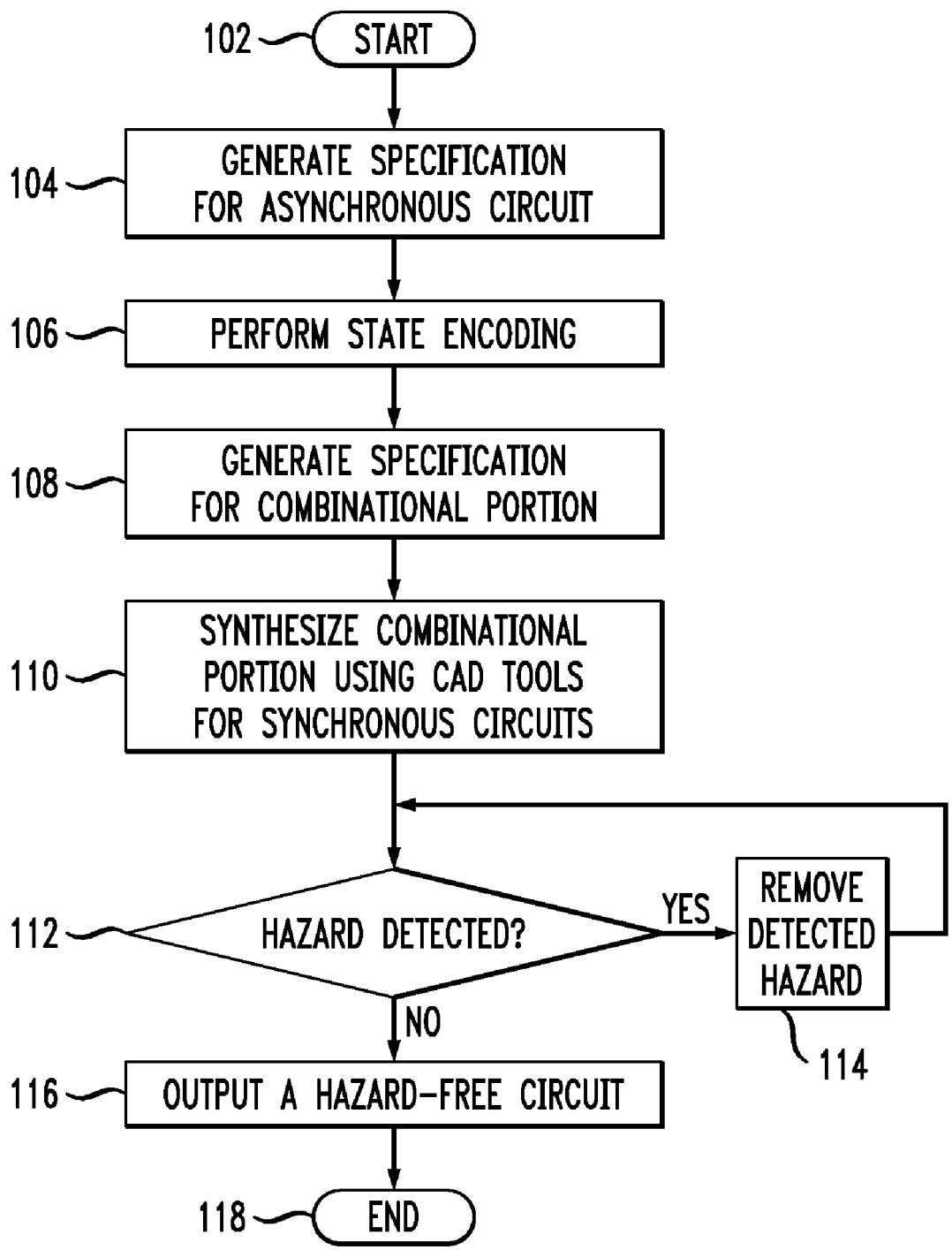

FIG. 2A
| BC \ A | 0 | 1 |
|---|---|---|
| 00 | 0 | 0 |
| 01 | 0 | 1 |
| 11 | (1) → (1) | |
| 10 | 1 | 0 |
FIG. 2B
200
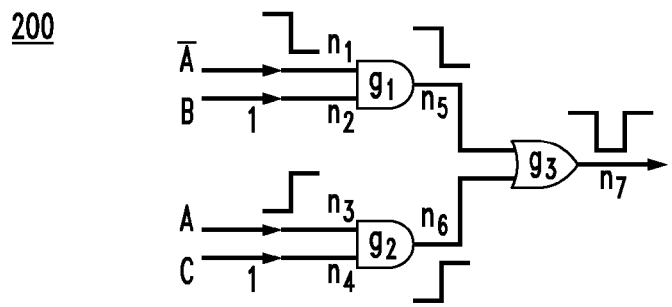
FIG. 2C
200'
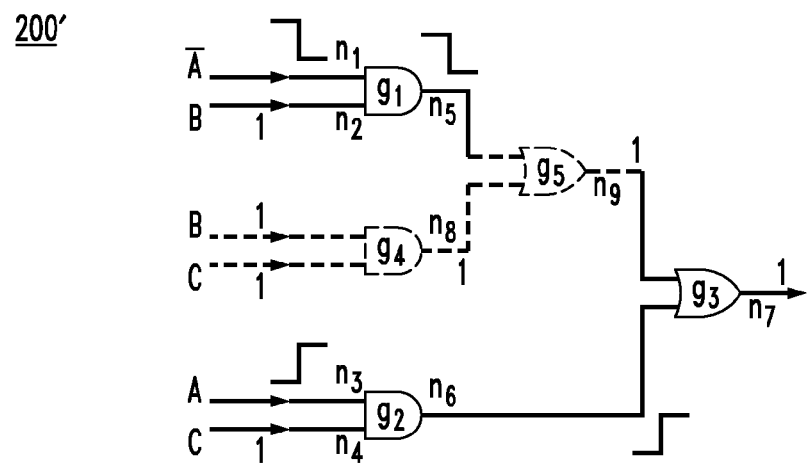

FIG. 3A
| AB\CD | 00 | 01 | 11 | 10 |
|---|---|---|---|---|
| 00 | 1 | 1 | 1 | 1 |
| 01 | 0 | 1 | 1 | 0 |
| 11 | 0 | 1 | 1 | 0 |
| 10 | 1 | 1 | 0 | 0 |
FIG. 3B
300
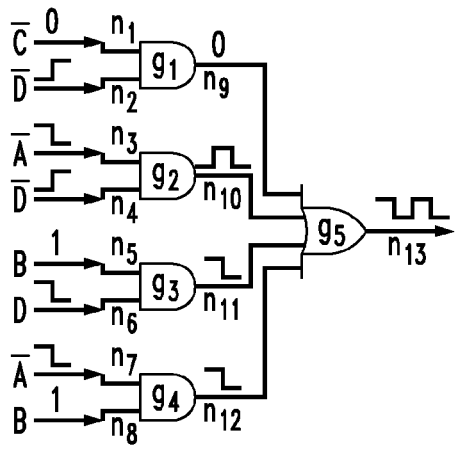
FIG. 3C
300'
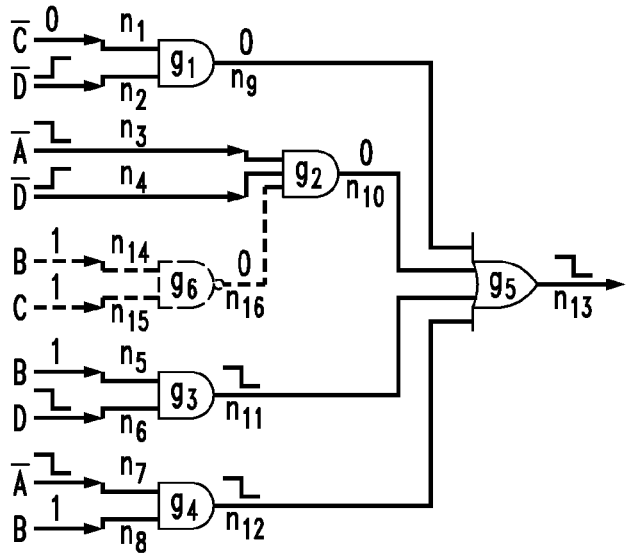

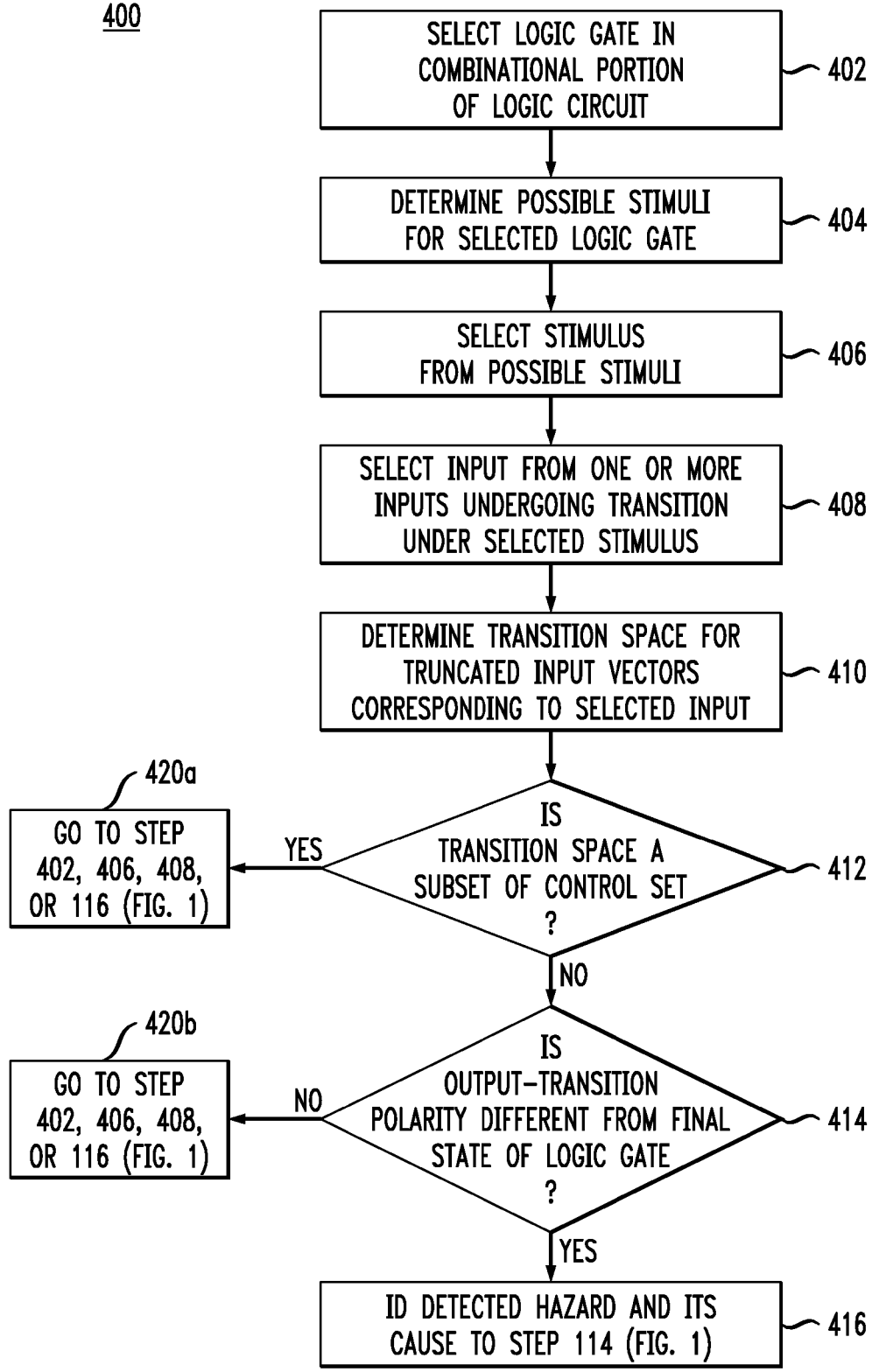

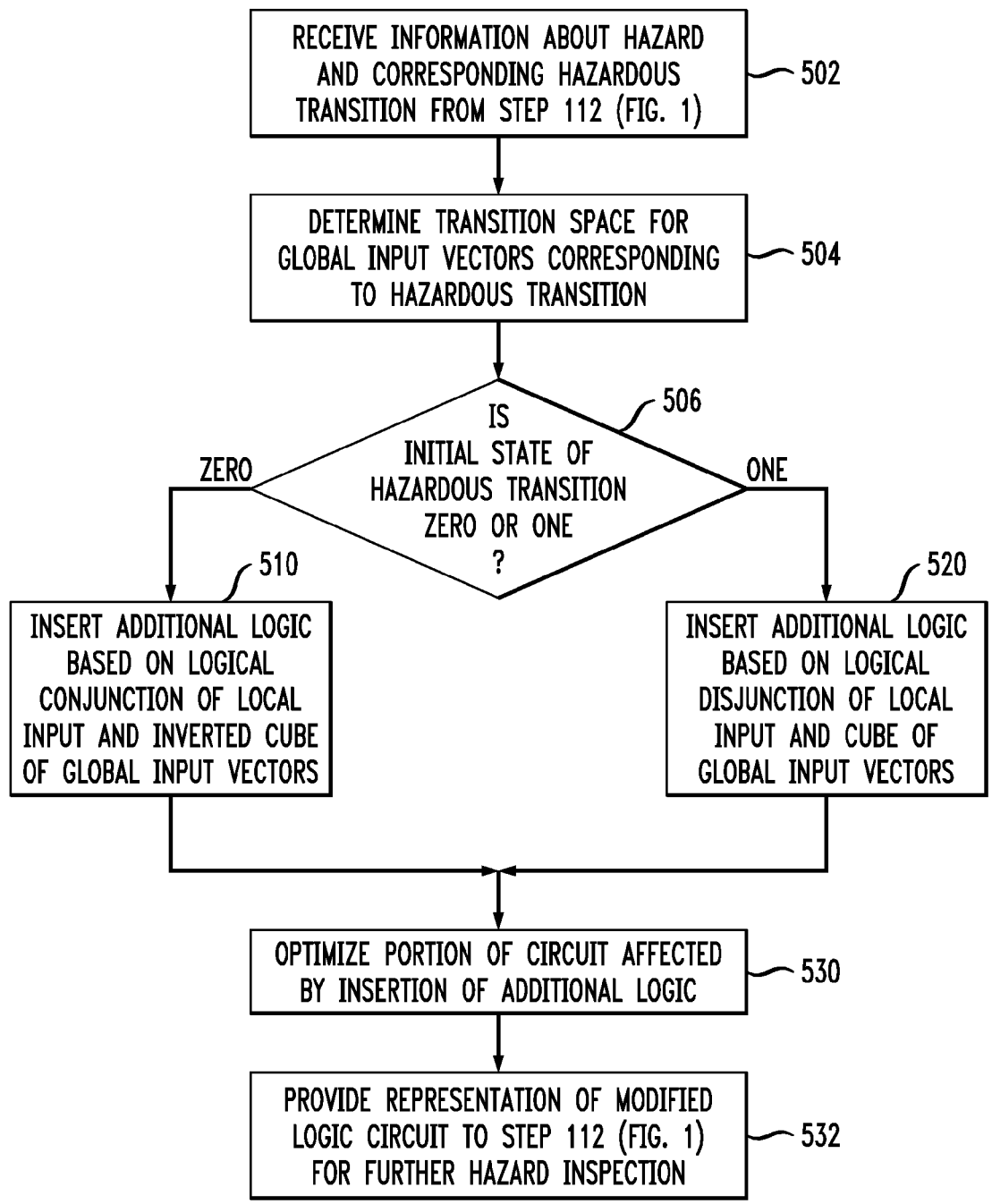

DETECTION AND REMOVAL OF HAZARDS DURING OPTIMIZATION OF LOGIC CIRCUITS

BACKGROUND OF THE INVENTION

1. Field of the Invention

The present invention relates to logic devices, e.g., application-specific integrated circuits (ASICs), programmable logic devices (PLDs), and field-programmable gate arrays (FPGAs), and to computer-aided design (CAD) tools used in the production of such logic devices.

2. Description of the Related Art

This section introduces aspects that may help facilitate a better understanding of the invention(s). Accordingly, the statements of this section are to be read in this light and are not to be understood as admissions about what is in the prior art or what is not in the prior art.

An asynchronous (also often referred to as an event-driven and/or self-timed) circuit is a circuit that operates without the coordination of one or more globally distributed periodic timing signals called clocks. In contrast, operation of a synchronous circuit is sequenced based on a global clock. Although asynchronous circuits might offer certain advantages over their synchronous counterparts, such as relatively low power consumption, robustness with respect to environmental variations, no clock-skew issues, relatively low electromagnetic interference, and convenient modularity, asynchronous circuits often impose additional operational constraints. For example, it is typically required that an asynchronous logic circuit be glitch-free because of possible malfunctions due to the treatment of glitches as real changes in value.

In general, a digital output signal in a logic circuit might either remain unchanged or change as a result of a circuit action or event. In both situations, the signal might contain a glitch, i.e., one or more reverberations between two digital levels that occur in response to a change in the logic input configuration before the signal finally settles at a corresponding logic level. For example, if the initial and final levels are different and the transition between those levels is not monotonic, then it is said that the signal has a dynamic glitch. On the other hand, if the initial and final levels are supposed to be the same, but the signal still reverberates between two digital levels before settling back to the original (unchanged) level, then it is said that the signal has a static glitch. An asynchronous logic circuit that can potentially produce an unwanted glitch in its output signal is said to contain a hazard. Hence, having a CAD design tool capable of producing hazard-free asynchronous logic circuits is very desirable.

SUMMARY OF THE INVENTION

Disclosed herein is a method of generating a hazard-free representation of an asynchronous logic circuit that can leverage the powerful and mature synchronous-circuit CAD synthesis tools. In a representative embodiment of the method, an initial representation of a specified asynchronous logic circuit is synthesized using one of such CAD tools. The initial representation is then (i) analyzed to identify hazardous transitions and (ii) modified, e.g., by iteratively inserting additional logic aimed at preventing the identified hazardous transitions from producing glitches, until a hazard-free representation of the specified asynchronous logic circuit is produced.

According to one embodiment, provided is a computer-implemented method of generating a representation of a logic circuit, the method comprising the steps of: (A) identifying a hazardous transition in an initial representation of the logic circuit; and (B) modifying the initial representation of the logic circuit based on transition polarity of the identified hazardous transition to generate a modified representation of the logic circuit, wherein said modification is aimed at preventing the identified hazardous transition from producing a glitch at an output terminal of a logic gate whose input terminal received said hazardous transition in the initial representation.

According to another embodiment, provided is a machine-readable medium, having encoded thereon program code, wherein, when the program code is executed by a machine, the machine implements the above-specified method of generating a representation of a logic circuit.

According to yet another embodiment, provided is an integrated circuit having implemented therein the logic circuit corresponding to a hazard-free representation generated by implementing on a computer the above-specified method of generating a representation of a logic circuit.

According to yet another embodiment, provided is a hazard-free representation of the logic circuit, said hazard-free representation generated by implementing on a computer the above-specified method of generating a representation of a logic circuit.

BRIEF DESCRIPTION OF THE DRAWINGS

Other aspects, features, and benefits of the present invention will become more fully apparent from the following detailed description, the appended claims, and the accompanying drawings in which:

FIG. 1 shows a flowchart of a method for producing a hazard-free asynchronous logic circuit according to one embodiment of the invention;

FIGS. 2A-C illustrate the application to an exemplary logic circuit of the steps of detecting and removing hazards in the method of FIG. 1;

FIGS. 3A-C illustrate the application to another exemplary logic circuit of the steps of detecting and removing hazards in the method of FIG. 1;

FIG. 4 shows a flowchart of a method of detecting hazards that can be used in the method of FIG. 1 according to one embodiment of the invention; and FIG. 5 shows a flowchart of a method of removing hazards that can be used in the method of FIG. 1 according to one embodiment of the invention.

DETAILED DESCRIPTION

With all potential advantages of asynchronous circuits, the presence of hazards is a major reason for the continued market domination of synchronous circuits and systems. More specifically, in a synchronous circuit, a designer can define the combinational logic necessary to compute the specified functions and then surround that combinational logic with latches. By setting the clock rate to a relatively low value, possible hazard-induced errors are usually prevented because the latches block the propagation of glitches and enable sensitive output signals to be substantially glitch-free.

In contrast, designers of asynchronous circuits are usually forced to pay a great deal of attention to the dynamic state of the circuit. For example, the ordering of operations, which is addressed in a synchronous circuit by an appropriate placement of latches, has to be carefully controlled in an asynchronous circuit, e.g., by introducing additional, dedicated asynchronous control logic. For relatively complex asynchronous logic circuits, hazard-related issues become too difficult to handle by hand. However, existing CAD tools and implementation alternatives, which are relatively well developed for synchronous circuits, are generally not leveraged in the design of asynchronous circuits. One reason for this state of affairs is most synchronous-circuit CAD functions either need significant modifications for application to asynchronous circuits or are not applicable at all.

FIG. 1 shows a flowchart of a method 100 for producing a hazard-free asynchronous logic circuit according to one embodiment of the invention. Unlike conventional design methods for asynchronous logic circuits, method 100 takes advantage of the powerful and mature synchronous-circuit CAD tools, including the synthesis algorithms and technology libraries. Method 100 supplements the synchronous-circuit CAD tools by a hazard-analysis method that is capable of detecting a hazard and identifying the cause of that hazard in an arbitrary circuit structure synthesized with the synchronous-circuit CAD tools. Method 100 then invokes a hazard-removal process to generate a hazard-free asynchronous logic circuit.

Method 100 is most suitable for the design of fundamental-mode asynchronous logic circuits. As used herein, the term "fundamental mode" means that the circuit is designed to operate so that (i) input changes arrive in bursts and (ii) the time interval between two consecutive bursts is sufficiently large to enable the output signals and the feedback variables of the combinational portion of the logic circuit to settle to a steady state corresponding to the first burst before the arrival of the second burst. In general, fundamental-mode asynchronous logic circuits permit both single-input changes (SICs) and multiple-input changes (MICs).

Method 100 begins at step 102 where the corresponding CAD software is activated in a computer or workstation. In general, the CAD software supports and automates a creative process of converting an abstract form of desired system behavior into a design implementation in terms of logic gates and other appropriate hardware elements. A human designer can generally intervene at any step of method 100 to direct it toward a desired outcome.

At step 104, desired behavior and/or functionality is specified for the logic circuit that is being designed. In one embodiment, step 104 uses the specification format of asynchronous state machines. In another embodiment, step 104 uses the specification format of Petri nets, which provide a convenient graphical notation for stepwise processes that include choice, iteration, and/or concurrent execution. CAD tools often rely on Petri nets because a Petri net has an exact mathematical definition of its execution semantics and is supported by a well-developed mathematical theory for process analysis. Signal transition graphs (STGs) are a subclass of Petri nets that is often invoked in CAD.

At step 106, state encoding is performed, e.g., on an asynchronous state machine corresponding to the specification generated at step 104. More specifically, various logic states of the asynchronous state machine are transformed into a binary description.

At step 108, desired properties are specified for the combinational portion of the logic circuit that is being designed. In digital circuit theory, combinational logic (also often referred to as combinatorial logic) is a type of logic whose output is a pure function of the present input(s). Combinational logic is contrasted with sequential logic, in which the output depends not only on the present input(s), but also on the history of the input(s). In other words, sequential logic has event memory while combinational logic does not. Practical logic circuits usually contain a mixture of combinational and sequential logic. The properties that are specified at step 108 might include, e.g., the truth table of the Boolean function that the combinational logic implements.

At step 110, a high-level description of the combinational portion of the logic circuit generated in the preceding steps of method 100 is converted into a gate-level circuit representation using one or more CAD tools applicable to and developed for synchronous logic circuits. The conversion process normally relies on a technology library that contains a collection of (i) basic logic gates, such as AND, OR, and NOT gates, and/or (ii) standard macro cells, such as adders, MUXes, and flip-flops. The circuit representation is optimized to meet various design constraints, such as timing, circuit area, testability, and power consumption. In various embodiments, step 110 might employ various synchronous-circuit design-software packages that are commercially available, e.g., from Synopsys, Inc., of Mountain View, Calif.; Cadence Design Systems, Inc., of San Jose, Calif.; and Mentor Graphics, Inc., of Wilsonville, Oreg.

At step 112, the circuit representation generated at step 110 is checked for hazards. If a hazard is detected, then a cause of that hazard is identified and disclosed to step 114. The cause is usually a circuit element or a cell that can produce a glitch at its output in case of a propagation-delay difference between two or more signal paths feeding its inputs. If no hazard is detected, then the processing of method 100 is directed to step 116.

At step 114, the hazard identified at step 112 is removed, e.g., by inserting into the immediate surroundings of the identified element or cell additional logic elements that block hazard-inducing signal transitions. The processing of method 100 is directed back to step 112 after the completion of step 114.

At step 116, a hazard-free circuit representation is saved using an appropriate storage medium, e.g., a magnetic or optical disk. The stored circuit representation can then be transferred to a fabrication facility and used therein to produce a physical implementation of the corresponding hazard-free asynchronous logic circuit.

The processing of method 100 ends at step 118.

Steps 112 and 114 of method 100 will now be described in more detail. The description includes (i) an explanation of relevant concepts; (ii) formulation of applicable theorems; and (iii) representative examples of circuit modifications aimed at removing hazards.

Hazard Types

There are two types of combinational hazards: function hazards and logic hazards. Function hazards are a property of the logic function itself and can be removed through appropriate placement of delay elements. Logic hazards are a property of the specific implementation of the logic function and can be removed through appropriate modification of the implementation.

Logic hazards are classified into static hazards and dynamic hazards. For a logic function $f$ defined over an n-dimensional binary input space $\{0,1\}^n$ that contains points a and b, static hazards reveal themselves in transitions for which $f(a)=f(b)$, and dynamic hazards reveal themselves in transitions for which $f(a) \neq f(b)$. Single-input changes (SICs) might trigger both static and dynamic hazards if the structure of the circuit is not appropriately constrained. Multiple-input changes (MICs) might also trigger both static and dynamic hazards.

A logic gate is an atomic component of a logic circuit and is assumed to contain no logic hazards. Usually, a logic gate taken in step 110 of method 100 from a technology library is such an atomic component. In a rare event that the technology library includes logic gates containing hazards, those logic gates can be replaced with logically equivalent, alternative circuits that contain no hazards. This replacement can be carried out through direct modification of the technology library or, alternatively, during step 114 of method 100.

Linearly Separable Logic Functions and Gates

Of particular importance to method 100 are Boolean linearly separable functions. Suppose that a Boolean function $f$ takes n binary inputs $(x_1, \ldots, x_n)$ defined over an n-dimensional binary space $B^n$ and has one binary output, i.e., in mathematical terms, $f(x_1, \ldots, x_n): B^n \rightarrow \{0,1\}$, where n is a positive integer. Let us denote: (i) a set of points from $B^n$ that function $f$ maps to binary one as $\chi_1$, and (ii) a set of points from $B^n$ that functions maps to binary zero as $\chi_0$. Then, function $f$ is linearly separable if, in the n-dimensional real space $R^n$ corresponding to binary space $B^n$, there exists a hyperplane $\Pi$ that strictly separates $\chi_1$ and $\chi_0$ and whose intersection with $B^n$ is an empty set. As used herein, the term "strictly separates" means that any real-space trace connecting a point from $\chi_1$ and a point from $\chi_0$ intersects hyperplane $\Pi$.

Let us define truncated vector $X^{(i)}$ as $(x_1, \ldots, x_{i-1}, x_{i+1}, \ldots, x_n)$, where i can be any positive integer between 1 and n, including 1 and n. Let us further define a concatenation operation (hereafter denoted as $\circ$) so that $X^{(i)} \circ b = (x_1, \ldots, x_{i-1}, b, x_{i+1}, \ldots, x_n)$, where $b \in \{0,1\}$. Then, we shall call vector $X^{(i)}$ a control value of Boolean function $f$ if and only if $f(X^{(i)} \circ 0) = f(X^{(i)} \circ 1)$. For example, a binary zero on any input of an AND function is a control value because it sets the output value of the AND function to zero regardless of other input values. Similarly, a binary one on any input of an OR function is a control value because it sets the output value of the OR function to one regardless of other input values.

For any selected value of i, e.g., $i = i_0$, the set that includes all control values $X^{(i_0)}$ shall be referred to as a control set, $C_f^{(i_0)}$, corresponding to input $i_0$.

Given the above definitions, one can formulate Theorem (1):

If Boolean function $f(x_1, \ldots, x_n): B^n \rightarrow \{0,1\}$ is linearly separable, then $$\forall X_1^{(i)} \notin C_f^{(i)}, X_2^{(i)} \notin C_f^{(i)},$$

$$f(X_1^{(i)} \circ 0) = f(X_2^{(i)} \circ 0), \text{ and}$$

$$f(X_1^{(i)} \circ 1) = f(X_2^{(i)} \circ 1).$$

The following provides a proof of Theorem (1).

Since $f(x_1, \ldots, x_n): B^n \rightarrow \{0,1\}$ is linearly separable, input sets $\chi_1$ and $\chi_0$ are strictly separated by hyperplane $\Pi$ defined by Eq. (1):

$$\hat{c} \cdot \hat{x} = c_1 x_1 + c_2 x_2 + \ldots + c_n x_n = d \quad (1)$$

where d and $c_1 \ldots c_n$ are real numbers. Because $\forall X_1^{(i)} \notin C_f^{(i)}$, it follows that $f(X_1^{(i)} \circ 0) \neq f(X_1^{(i)} \circ 1)$. Let us assume that:

$$\hat{c} \cdot \overline{(X_1^{(i)} \circ 0)} > d \quad (2)$$

Since $f(X_1^{(i)} \circ 0) \neq f(X_1^{(i)} \circ 1)$, it follows that:

$$\hat{c} \cdot \overline{(X_1^{(i)} \circ 1)} < d \quad (3)$$

By subtracting Eq. (2) from Eq. (3) and using Eq. (1) one finds that $c_i < 0$. Because $\forall X_2^{(i)} \notin C_f^{(i)}$, it follows that $f(X_2^{(i)} \circ 0) \neq f(X_2^{(i)} \circ 1)$. If we now assume that:

$$\hat{c} \cdot \overline{(X_2^{(i)} \circ 0)} < d \quad (4)$$

then, from $f(X_2^{(i)} \circ 0) \neq f(X_2^{(i)} \circ 1)$, it follows that:

$$\hat{c} \cdot \overline{(X_2^{(i)} \circ 1)} > d \quad (5)$$

By subtracting Eq. (4) from Eq. (5) and using Eq. (1), one now finds that $c_i > 0$ which contradicts the previous result. This contradiction means that the second assumption is incorrect, meaning that, in fact, the opposite is true, i.e.:

$$\hat{c} \cdot \overline{(X_2^{(i)} \circ 0)} > d \quad (6)$$

$$\hat{c} \cdot \overline{(X_2^{(i)} \circ 1)} < d \quad (7)$$

It then follows from Eqs. (2) and (6) that $f(X_1^{(i)} \circ 0) = f(X_2^{(i)} \circ 0)$. It similarly follows from Eqs. (3) and (7) that $f(X_1^{(i)} \circ 1) = f(X_2^{(i)} \circ 1)$.

In terms of a logic gate or cell that implements linearly separable function $f$, Theorem (1) means that a signal transition on an input of that gate or cell can only change the output of that gate or cell in one direction, regardless of the values on the other inputs, as long as those other inputs remain stable. Applying this result, for example, to a standard NAND gate, one finds that a rising transition on one input of the NAND gate does not cause a rising transition on the output, regardless of the input value on the other input. Applying the above result to logic gates that implement other linearly separable functions, one can similarly arrive at certain conclusions about the directionality of transitions in those gates.

As used herein the term "linearly separable logic gate" refers to a logic gate that implements a linearly separable logic function. In general, most of the logic gates found in the technology library that is invoked at step 110 of method 100 are linearly separable logic gates. For example, each of the following logic gates is a linearly separable logic gate: AND gate, OR gate, NOT gate, NAND gate, and NOR gate. One example of a logic gate that is not a linearly separable logic gate is a multiplexer (MUX). Nonlinearly separable logic gates can usually be replaced by logically equivalent sub-circuits composed of linearly separable logic gates.

Detecting Hazards

Generally, signal transitions on a terminal of a logic gate can be sorted into two types, i.e., rising transitions and falling transitions. A rising transition, which is a change from a binary zero to a binary one, is hereafter denoted as (0,1). A falling transition, which is a change from a binary one to a binary zero, is hereafter denoted as (1,0).

Let us define transition polarity p as a function p: $\{(0,1), (1,0)\} \rightarrow \{0,1\}$ so that $p(0,1) = 1$ and $p(1,0) = 0$. In plain language, this definition means that the polarity of a rising transition is one, and the polarity of a falling transition is zero. Note that the transition polarity is not defined for non-transitions, i.e., for (1,1) and (0,0).

Let us now consider an i-th input of an arbitrary logic gate. If the other inputs of the logic gate are not set to any of the control values, then a transition on the i-th input generates a transition on the output of the logic gate. If, in addition, the logic gate implements a linearly separable function, then the polarity of the output transition is unambiguously determined by the polarity of the input transition, regardless of the values on the other inputs. Therefore, for each input of a linearly separable logic gate g, we can define gate polarity r to describe the manner in which the logic gate translates the polarity of the input transition into the polarity of the corresponding output transition. More specifically, for a given i-th input, polarity $r^{(i)}$ of linearly separable gate g is defined as:

$$r^{(i)} = f(a^{(i)} \circ 1) \quad (8)$$

where $a^{(i)} \notin C_f^{(i)}$ and $f$ is the linearly separable logic function implemented by gate g. For example, the gate polarity of a conventional OR gate is one (i.e., $r^{(i)} = 1$) because the OR gate does not invert the transition polarity while translating it from an input to the output. Note that the gate polarity is not defined for a non-linearly separable logic gate, where the transition polarity at the output depends on both the transition polarity at the changing input and the present input pattern on the other inputs. If a transition polarity $p_i$ at an input i of linearly separable gate g is known, then the corresponding transition polarity $p_{out}$ at the output of gate g can be determined according to Eq. (9):

$$p_{out} = XNOR(r^{(i)}, p_i) \quad (9)$$

where XNOR is a Boolean exclusive-nor operation, and gate polarity $r^{(i)}$ is defined by Eq. (8).

A stimulus applied to logic gate g can be characterized by two local input vectors a and b having as components the initial and final input values, respectively, applied to logic gate g, where a, $b \in B^n$ and $a \neq b$. If the Hamming distance between vectors a and b is 1, then the stimulus corresponds to a SIC. If the Hamming distance between vectors a and b is greater than 1, then the stimulus corresponds to a MIC. (As used herein, the term "Hamming distance" refers to the number of components, in which two vectors of equal dimensionality differ from one another. In other words, the Hamming distance measures the minimum number of substitutions required to change one vector into the other.) Vectors a and b uniquely determine a transition space, T[a,b], which is defined as the smallest Boolean subspace that contains a and b.

Given the above definitions, one can formulate Theorem (2):

Logic gate g implementing linearly separable Boolean function $f$ generates a hazard at the gate's output after receiving a stimulus characterized by local input vectors a and b if and only if there exists a transition $t^{(i)}$ at an i-th input of logic gate g, wherein, for $T[a^{(i)}, b^{(i)}] \not\subset C_f^{(i)}$, $$XNOR(p_i(t^{(i)}), r^{(i)}) \neq f(b),$$

where $p_i(t^{(i)})$ is the polarity of transition $t^{(i)}$, and $a^{(i)}$ and $b^{(i)}$ are the truncated local input vectors having as components the gate inputs other than the i-th input.

The following provides a proof of Theorem (2).

Since $T[a^{(i)}, b^{(i)}] \not\subset C_f^{(i)}$, there must exist vector $c^{(i)}$ for which the following is true: $c^{(i)} \in T[a^{(i)}, b^{(i)}]$ and $c^{(i)} \notin C_f^{(i)}$. As already indicated above, a fundamental-mode circuit can have arbitrary gate and wire delays. Therefore, there can potentially be selected a combination of input delays that set the inputs other than the i-th input to $x^{(i)} = c^{(i)}$ for a certain short period of time during transition $t^{(i)}$. As a result, the output of gate g can change to $XNOR(p_i(t^{(i)}), r^{(i)}) \neq f(b)$. However, the output must eventually change to $f(b)$. Therefore, there exists a hazard at the output of gate g.

Now consider the case of $XNOR(p_i(t^{(i)}), r^{(i)}) = f(b)$ for the i-th input receiving transition $t^{(i)}$, wherein $T[a^{(i)}, b^{(i)}] \not\subset C_f^{(i)}$. Let us assume that $t^{(i)} = (v_1, v_2)$ and $x^{(i)} = c^{(i)}$ when $t^{(i)}$ occurs. If the output of gate g has changed to $f(b)$, then it must be true that $c^{(i)} \in C_f^{(i)}$, because otherwise $f(c^{(i)} \circ v_1) \neq f(c^{(i)} \circ v_2) = XNOR(p_i(t^{(i)}), r^{(i)})$, which contradicts the assumption that the output already was $f(b)$. It therefore follows that transition $t^{(i)}$ does not affect the output of gate g. It further follows that transition $t^{(i)}$ can only cause the output of gate g to switch to $f(b)$ when the output is still $f(a)$. Thus, no hazard is generated when $XNOR(p_i(t^{(i)}), r^{(i)}) = f(b)$.

Note that, in the above proof of Theorem (2), no constraint was placed on the Hamming distance between input vectors a and b. Therefore, Theorem (2) is applicable to both SIC and MIC hazards. Moreover, Theorem (2) is applicable to static and dynamic hazards and to logic and function hazards.

FIGS. 2A-B show a first example of applying Theorem (2) to the detection of hazards at step 112 of method 100. More specifically, FIG. 2A shows the truth table for a logic circuit 200 shown in FIG. 2B. Logic circuit 200 comprises three logic gates g1-g3 interconnected as shown in FIG. 2B. Each of gates g1-g2 is an AND gate. Gate g3 is an OR gate. There are four input terminals n1-n4 to logic circuit 200, not all of which are independent. The relationship between interdependent inputs is indicated by letters A-C, with a bar over the letter indicating an inversion operation. The eight possible binary combinations for the three-bit input word ABC received by logic circuit 200 and the corresponding binary output values produced by the logic circuit at output terminal n7 of gate g3 are tabulated in FIG. 2A.

Referring to FIG. 2B, for gate g3, the shown local input vector, which is applied to input terminals n5-n6, changes from a=(1,0) to b=(0,1). Using the definitions of truncated input vectors $a^{(i)}$ and $b^{(i)}$ in Theorem (2), one can determine these vectors for transition $t^{(n5)}$ of gate g3. Since gate g3 has two inputs, each of vectors $a^{(i)}$ and $b^{(i)}$ consists of a single component. More specifically, $a^{(i)} \equiv a^{(n5)} = 0$ because the initial value applied to input terminal n6 is 0. Similarly, $b^{(i)} \equiv b^{(n5)} = 1$ because the final value applied to input terminal n6 is 1. Using the definition of $T[a^{(i)}, b^{(i)}]$, one finds that, for input terminal n5 of gate g3, $T[a^{(i)}, b^{(i)}] \equiv T[a^{(n5)}, b^{(n5)}] = \{1, 0\}$. Since gate g3 is an OR gate, its control set $C_f^{(i_0)} \equiv C_{OR}^{(n5)} = \{1\}$. Comparing $T[a^{(n5)}, b^{(n5)}] = \{1, 0\}$ and $C_{OR}^{(n5)} = \{1\}$, one finds that $T[a^{(n5)}, b^{(n5)}] \not\subset C_{OR}^{(n5)}$. This result indicates that the first condition (i.e., $T[a^{(i)}, b^{(i)}] \not\subset C_f^{(i)}$) stated in Theorem (2) is satisfied for gate g3 of logic circuit 200.

Continuing on with the application of Theorem (2) to gate g3 of logic circuit 200, one needs to determine the values of $XNOR(p_i(t^{(i)}), r^{(i)})$ and $f(b)$ for that gate and then compare them to see whether the second condition (i.e., $XNOR(p_i(t^{(i)}), r^{(i)}) \neq f(b)$) stated in Theorem (2) is satisfied. The corresponding calculations are given by Eqs. (10)-(11):

$$XNOR(p_i(t^{(i)}), r^{(i)}) \equiv XNOR(p_{n5}(t^{(n5)}), r^{(n5)}) = XNOR(0,1) = 0 \quad (10)$$

$$f(b) \equiv OR(0,1) = 1 \quad (11)$$

Since the two sets of calculations expressed by Eqs. (10) and (11), respectively, produce different results, it follows that the second condition of Theorem (2) is also satisfied for gate g3 of logic circuit 200.

Since both conditions of Theorem (2) are satisfied for gate g3 of logic circuit 200, the theorem tells us that gate g3 can generate a hazard at output terminal n7. This conclusion is, of course, consistent with the generally known fact that a two-input OR gate (such as gate g3) can generate a glitch when a rising transition arrives at the first input terminal of the gate after a falling transition has already arrived at the second input terminal of the gate. A waveform illustrating a typical shape of the glitch is shown in FIG. 2B next to output terminal n7.

FIGS. 3A-B show a second example of applying Theorem (2) to the detection of hazards at step 112 of method 100. More specifically, FIG. 3A shows the truth table for a logic circuit 300 shown in FIG. 3B. Logic circuit 300 comprises five logic gates g1-g5 interconnected as shown in FIG. 3B. Each of gates g1-g4 is an AND gate. Gate g5 is an OR gate. There are eight input terminals n1-n8 to logic circuit 300, not all of which are independent. The relationship between interdependent inputs is indicated by letters A-D, with a bar over the letter indicating an inversion operation. The sixteen possible binary combinations for the four-bit input word ABCD received by logic circuit 300 and the corresponding binary output values produced by the logic circuit at output terminal n13 of gate g5 are tabulated in FIG. 3A.

Referring to FIG. 3B, for gate g2, the shown local input vector, which is applied to input terminals n3-n4, changes from a=(1,0) to b=(0,1). To check for gate g2 the first condition stated in Theorem (2) (i.e., whether $T[a^{(i)},b^{(i)}] \not\subset C_f^{(i)}$), one performs the following calculations. Since gate g2 has two inputs, each of truncated local input vectors $a^{(i)}$ and $b^{(i)}$ consists of a single component. More specifically, $a^{(i)} \equiv a^{(n4)} = 1$ because the initial value applied to input terminal n3 is 1. Similarly, $b^{(i)} \equiv b^{(n4)} = 0$ because the final value applied to input terminal n3 is 0. Using the definition of $T[a^{(i)},b^{(i)}]$, one finds that, for input terminal n4 of gate g2, $T[a^{(i)},b^{(i)}] \equiv T[a^{(n4)}, b^{(n4)}] = \{1,0\}$. Since gate g2 is an AND gate, its control set $C_f^{(io)} \equiv C_{AND}^{(n4)} = \{0\}$. Comparing $T[a^{(n4)},b^{(n4)}] = \{1,0\}$ and $C_{AND}^{(n4)} = \{0\}$, one finds that $T[a^{(n4)},b^{(n4)}] \not\subset C_{AND}^{(n4)}$. This result means that the first condition stated in Theorem (2) is satisfied for gate g2 of logic circuit 300.

To check for gate g2 of logic circuit 300 the second condition stated in Theorem (2) (i.e., whether $XNOR(p_i(t^{(i)}), r^{(i)}) \neq f(b)$), one performs the calculations given by Eqs. (12)-(13):

$$XNOR(p_i(t^{(i)}),r^{(i)}) = XNOR(p_{n4}(t^{(n4)}),r^{(n4)}) = XNOR(1,1) = 1 \quad (12)$$

$$f(b) = AND(0,1) = 0 \quad (13)$$

Since the two sets of calculations expressed by Eqs. (12) and (13), respectively, produce different results, it follows that the second condition of Theorem (2) is also satisfied for gate g2 of logic circuit 300.

Since both conditions of Theorem (2) are satisfied for gate g2 of logic circuit 300, the theorem tells us that gate g2 can generate a hazard at output terminal n10. This conclusion is consistent with the generally known fact that a two-input AND gate (such as gate g2) can generate a glitch when a falling transition arrives at the first input terminal of the gate after a rising transition has already arrived at the second input terminal of the gate. A waveform illustrating a typical shape of the glitch is shown in FIG. 3B next to terminal n10. The glitch feeds into gate g5, for which terminal n10 is an input terminal, and manifests itself at output terminal n13 of that gate. A waveform illustrating a typical shape of that glitch is shown in FIG. 3B next to terminal n13.

FIG. 4 shows a flowchart of a method 400 of detecting hazards that can be used at step 112 of method 100 according to one embodiment of the invention. Method 400 is generally consistent with the hazard-detection process outlined above in reference to FIGS. 2 and 3. Method 400 assumes that the combinational portion of the logic circuit, to which the method is being applied, does not contain logic gates that are not linearly separable logic gates. This assumption means that the technology library invoked at step 110 of method 100 has been appropriately edited to contain only linearly separable logic gates.

Method 400 proceeds by inspecting, gate by gate, various logic gates of the combinational portion of the logic circuit. Each gate is processed based on Theorem (2) to determine whether it can produce a hazard. Since this processing involves inspection of various input scenarios for each particular gate, method 400 can be implemented using several nested loops that ensure that all relevant gates and all relevant transitions are appropriately covered and inspected. For clarity, the nested loops are not explicitly shown in FIG. 4, but rather are indicated by processing blocks 420a-b. One skilled in the art will be able to appropriately implement the nested loops based on the shown location of processing blocks 420a-b and the description of method 400 that follows.

At step 402 of method 400, a logic gate in the combinational portion of the logic circuit is selected for inspection.

At step 404, all possible stimuli are determined for the logic gate selected at step 402. Recall that a stimulus is characterized by two local input vectors a and b, with the state of the inputs changing from input vector a to input vector b. The logic circuitry that feeds the inputs of each particular logic gate determines the kind of local input vectors that the logic gate can possibly receive, which also unambiguously determines all possible stimuli. The possible stimuli can be sorted to form a list, which can then be inspected, e.g., line by line, during the subsequent processing in method 400.

At step 406, a stimulus is selected from the sorted list created at step 404. As already indicated above, the selected stimulus can correspond to a SIC or a MIC. If the selected stimulus corresponds to a SIC, then there is a single input that undergoes a transition. If the selected stimulus corresponds to a MIC, then there are two or more inputs that undergo respective transitions.

At step 408, from the list of inputs that undergo a transition under the stimulus selected at step 406, one input is selected for further analysis. In the nomenclature of Theorem (2), the selected input is the i-th input, and the transition that it undergoes is input transition $t^{(i)}$.

At step 410, transition space is determined for the truncated input vectors corresponding to the input selected at step 408. In the nomenclature of Theorem (2), the transition space is $T[a^{(i)},b^{(i)}]$, where $a^{(i)},b^{(i)}$ are the requisite truncated input vectors obtained from local input vectors a and b, respectively, by removing the i-th component of the input vector.

At step 412, it is ascertained whether the transition space determined at step 410 is a subset of the control set corresponding to the input selected at step 408. In the nomenclature of Theorem (2), step 412 finds out whether the condition of $T[a^{(i)},b^{(i)}] \not\subset C_f^{(i)}$ is satisfied. If the transition space is a subset of the control set, then further processing is directed to processing block 420a, which either loops the processing back to the appropriate one of steps 402, 406, and 408 or transfers the processing to step 116 of method 100. If the transition space is not a subset of the control set, then the processing of method 400 is directed to step 414.

At step 414, it is ascertained whether the output-transition polarity corresponding to the stimulus selected at step 406 and the input selected at step 408 is different from the final state of the logic gate. In the nomenclature of Theorem (2), step 414 finds out whether the condition of $XNOR(p_i(t^{(i)}), r^{(i)}) \neq f(b)$ is satisfied. If the output-transition polarity is the same as the final state of the logic gate, then further processing is directed to processing block 420b, which either loops the processing back to the appropriate one of steps 402, 406, and 408 or transfers the processing to step 116 of method 100. If the output-transition polarity is different from the final state of the logic gate, then a hazard has been detected.

At step 416, information about the detected hazard is provided to step 114 of method 100. In particular, step 416 pinpoints the cause of the detected hazard to step 114. As already indicated above, said cause is transition $t^{(i)}$ that satisfies Theorem (2). Hereafter, such transition is referred to as a hazardous transition.

Removing Hazards

As already indicated above, the cause of each detected hazard is the corresponding hazardous transition $t^{(i)}$. If the hazardous transition is somehow blocked (i.e., prevented from affecting the relevant outputs), then a corresponding glitch will not appear at the output of the logic gate. This approach is implemented at step 114 of method 100 (FIG. 1), which receives the requisite information about the identified hazardous transition from step 112 implemented, e.g., using method 400. The processing performed at step 114 uses this information to modify the logic circuit, without changing its overall logic function, so that the hazardous transition becomes blocked.

In one embodiment, step 114 relies on Theorem (3):

For a stimulus characterized by local input vectors $a=(a_1, \ldots, a_n)$ and $b=(b_1, \ldots, b_n)$ that impart a hazardous transition on input i of a linearly separable logic gate g, the corresponding hazard may be removed by gating input i with additional logic that transforms Boolean function $f(x_1, \ldots, x_i, \ldots, x_n)$ implemented by gate g into transformed functions $f'$, with:

$$f' \equiv f(x_1, \ldots, x_{i-1}, x_i \wedge \overline{c_{\hat{A},\hat{B}}}, x_{i+1}, \ldots, x_n), \text{ when } a_i=0;$$

or $$f' \equiv f(x_1, \ldots, x_{i-1}, x_i \vee c_{\hat{A},\hat{B}}, x_{i+1}, \ldots, x_n), \text{ when } a_i=1,$$

where $\hat{A}$ and $\hat{B}$ are the initial and final global input vectors, respectively, for the logic circuit that contains logic gate g, with local input vector a corresponding to global input vector $\hat{A}$ and local input vector b corresponding to global input vector $\hat{B}$; $\wedge$ and $\vee$ are the logical conjunction and disjunction operators, respectively, $(X_1, \ldots, X_m)$ is the string of components of a global input vector; $C_{\hat{A},\hat{B}}=1$ if and only if $$(X_1, \ldots, X_m) \in T[\hat{A},\hat{B}].$$

The following provides a proof of Theorem (3).

Original function $f$ and transformed function $f'$ specified in Theorem (3) have the same truth table at points $\hat{A}$ and $\hat{B}$. Indeed, if the global circuit input $\hat{X} \equiv (X_1, \ldots, X_m) \notin T[\hat{A},\hat{B}]$, then $C_{\hat{A},\hat{B}}=0$, which causes transformed function $f'$ to reduce to original function $f$. If $\hat{X} \in T[\hat{A},\hat{B}]$, then transformed function $f' \equiv f(x_1, \ldots, x_{i-1}, a_i, x_{i+1}, \ldots, x_n)$. First, it is self-evident that $f'(a)=f(a)$. Second, it must be true that $b^{(i)} \in C_f^{(i)}$, because otherwise $f(b)=\text{XNOR}(r^{(i)}, p(a_i, b_i))$, which contradicts the fact that transition $(a_i, b_i)$ is a hazardous transition, as confirmed by Theorem (2). Therefore, $f(b^{(i)} \circ a_i)=f(b)$, i.e., $f'(b)=f(b)$.

These results confirm that, if, using the transformation specified in Theorem (3), any hazardous transition corresponding to circuit-input transition $\hat{A} \rightarrow \hat{B}$ is removed for any logic gate affecting the circuit outputs, then the circuit becomes hazard-free for that particular circuit-input transition. Note, however, that the additional inserted logic might introduce hazards for other circuit-input transitions. Therefore, an iterative hazard-detection and circuit-modification process needs to be run to remove all hazards, i.e., the originally present hazards and any new hazards incidentally introduced during the process of removing the original hazards.

FIG. 2C shows how Theorem (3) can be used to remove a hazard from logic circuit 200 of FIG. 2B. More specifically, as explained earlier, circuit 200 has a static hazard at output terminal n7 for the circuit-input transition $\hat{A} \rightarrow \hat{B}$, in which $\hat{A}=(A=0,B=1,C=1)$ and $\hat{B}=(A=1,B=1,C=1)$ (see also FIG. 2A, where the arrow shows this transition in the truth table). Using Theorem (2), it was demonstrated that the transition shown in FIG. 2B on terminal n5 is the hazardous transition that causes the static hazard. Since the initial state of the hazardous transition is one (i.e., $a_i=1$), Theorem (3) directs us to apply the second of the two modifications specified therein, i.e., the modification expressed by $f' \equiv f(x_1, \ldots, x_{i-1}, x_i \vee C_{\hat{A},\hat{B}}, x_{i+1}, \ldots, x_n)$. We therefore insert additional logic to transform the signal on terminal n5 as follows: $n5'=n5 \vee c_{\hat{A},\hat{B}}$, where $C_{\hat{A},\hat{B}}=B \wedge C$. The inserted logic comprises logic gates g4-g5 shown by the dashed lines in FIG. 2C. In modified circuit 200' (FIG. 2C), the hazardous transition on terminal n5 is prevented from reaching gate g3. As a result, the glitch corresponding to the hazardous transition is removed from output terminal n7. Note that circuit 200' of FIG. 2C can now be optimized, e.g., by merging OR gates g3 and g5 into a three-input OR gate, without affecting its hazard-free characteristic.

FIG. 3C shows how Theorem (3) can be used to remove a hazard from logic circuit 300 of FIG. 3B. More specifically, as explained in the preceding subsection, circuit 300 has a dynamic hazard at output terminal n13 for the circuit-input transition $\hat{A} \rightarrow \hat{B}$, in which $\hat{A}=(A=0,B=1,C=1,D=1)$ and $\hat{B}=(A=1,B=1,C=1,D=0)$ (see also FIG. 3A, where the arrow shows this transition in the truth table). Using Theorem (2), it was demonstrated that the transition shown in FIG. 3B on terminal n4 of logic gate g2 is the hazardous transition that causes the dynamic hazard. Since the initial state of the hazardous transition is zero (i.e., $a_i=0$), Theorem (3) directs us to apply the first of the two modifications specified therein, i.e., the modification expressed by $f' \equiv f(x_1, \ldots, x_{i-1}, x_i \wedge \overline{c_{\hat{A},\hat{B}}}, x_{i+1}, \ldots, x_n)$. We therefore insert additional logic to block the hazardous transition in gate g2 according to the following prescription: $n4'=n4 \wedge \overline{c_{\hat{A},\hat{B}}}$, where $\overline{c_{\hat{A},\hat{B}}}=\overline{B} \wedge \overline{C}$. The modification transforms logic gate g2 into a three-input gate and adds NAND gate g6 shown by the dashed lines in FIG. 3C. In modified circuit 300' (FIG. 3C), the glitch on terminal n10 that was caused by the hazardous transition is now prevented. As a result, the glitch corresponding to the hazardous transition is also removed from output terminal n13. Similar to circuit 200', circuit 300' can undergo incremental optimization that does not affect its hazard-free characteristic. For example, the modification can be reduced to $n4'=n4 \wedge \overline{B}$ from the previously implemented $n4'=n4 \wedge \overline{B} \wedge \overline{C}$.

FIG. 5 shows a flowchart of a method 500 of removing hazards that can be used at step 114 of method 100 according to one embodiment of the invention. Method 500 is generally consistent with the hazard-removal process outlined above in reference to FIGS. 2 and 3. For logic insertion/modification, method 500 can generally invoke the same technology library as step 110 of method 100.

At step 502 of method 500, information about a hazard and the corresponding hazardous transition $t^{(i)}$ is received, e.g., from step 416 of method 400 (FIG. 4).

At step 504, transition space is determined for the global input vectors corresponding to the hazardous transition. In the nomenclature of Theorem (3), the transition space is $T[\hat{A},\hat{B}]$, where $\hat{A}$ and $\hat{B}$ are the initial and final global input vectors, respectively, corresponding to the hazardous transition.

At step 506, it is determined whether the initial state of the hazardous transition is a binary zero or a binary one. If the initial state is a binary zero, then the processing of method 500 is directed to step 510. If the initial state is a binary one, then the processing of method 500 is directed to step 520.

At step 510, based on a logical conjunction of (i) the local input having the hazardous transition and (ii) the inverted Euclidean cube of the global input vectors corresponding to the hazardous transition, additional logic is inserted. The additional logic uses inputs corresponding to the transition space determined at step 504 and serves to prevent the hazardous transition from producing a glitch at the output of the downstream logic gate that, in the unmodified circuit, receives the hazardous transition as an input. In terms of Theorem (3), step 510 corresponds to the circuit modification expressed by $f' \equiv f(x_1, \ldots, x_{i-1}, x_i \wedge \hat{c}_{\hat{A},\hat{B}}, x_{i+1}, \ldots, x_n)$. In the example of FIG. 3C, the modification is mathematically expressed as $n4'=n4 \wedge \overline{c_{\hat{A},\hat{B}}}$, where $\overline{c_{\hat{A},\hat{B}}}=\hat{B} \wedge \hat{C}$. As already explained above, the modification corresponds to (i) the transformation of logic gate g2 into a three-input gate and (ii) the addition of NAND gate g6 (see FIGS. 3B-C).

At step 520, based on a logical disjunction of (i) the local input having the hazardous transition and (ii) the Euclidean cube of the global input vectors corresponding to the hazardous transition, additional logic is inserted into the logic circuit. The additional logic uses inputs corresponding to the transition space determined at step 504 and serves to prevent the hazardous transition from producing a glitch at the output of the downstream logic gate that, in the unmodified circuit, receives the hazardous transition as an input. In terms of Theorem (3), step 520 corresponds to the circuit modification expressed by $f'\equiv f(x_1, \ldots, x_{i-1}, x_i \vee c_{\hat{A},\hat{B}}, x_{i+1}, \ldots, x_n)$. In the example of FIG. 2C, the modification is mathematically expressed as $n5' \equiv n5 \vee C_{\hat{A},\hat{B}}$, where $c_{\hat{A},\hat{B}} = B \wedge C$. As already explained above, the modification corresponds to the insertion of logic gates g4-g5 (see FIGS. 2B-C).

At optional step 530, the modified circuit produced at step 510 or step 520 is further modified, without changing its overall logic function, to optimize the portion of the circuit that has been affected by the modifications introduced at step 510/520. As already indicated above, an exemplary modification corresponding to step 530 would be a merger of OR gates g3 and g5 in circuit 200' (FIG. 2C) into a three-input OR gate.

At step 532, a representation of the modified circuit produced as a result of steps 510/520 and 530 is provided to step 112 of method 100 for further hazard inspection.

Although various embodiments of the invention were described in reference to asynchronous logic circuits, they can similarly be used to modify hazard-inducing elements in synchronous logic circuits. Although, in synchronous logic circuits, glitches generated before the circuit stabilizes are masked by clock signals and do not propagate through latches or flip-flops, these glitches generally increase energy consumption in the circuit. Therefore, hazard detection and removal methods disclosed herein can advantageously be used, e.g., to reduce power consumption in synchronous circuits.

As used herein, the term "representation of a logic circuit" refers to a circuit schematic that meets the specifications stipulated for the logic circuit. A representation of the logic circuit can be, e.g., in form of an electronic file or an annotated circuit diagram.

As used herein, the term "local input vector" refers to the values applied to input terminals of a particular gate. For example, in FIG. 3C, a local input vector for gate g2 has as its components the values applied to terminals n3, n4, and n16. Similarly, a local input vector for gate g5 has as its components the values applied to terminals n9-n12. In contrast, the term "global input vector" refers to the values that appear as inputs in the truth table for the logic circuit as a whole. For example, for circuits 300 and 300' (FIG. 3), a global input vector has as its components the values of A, B, C, and D, which appear as inputs in the truth table shown in FIG. 3A.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. A computer-implemented method of generating a representation of a logic circuit, the method comprising:
   providing an initial representation of a plurality of interconnected logic gates of the logic circuit to a computer having a memory with processor executable program code stored in the memory, and a processor configured to execute the program code;
   the computer inspecting one or more interconnected logic gates to identify a hazardous transition by selecting a logic gate and a stimulus to apply to the logic gate and identifying inputs that undergo a transition from the stimulus;
   the computer determining which inputs receive a hazardous transition due to the stimulus by selecting an input, determining a transition space for the input and whether the transition space is a subset of a control set, determining output-transition polarity for the input, and comparing the output-transition polarity with a final output;

the computer modifying the initial representation of the logic circuit based on transition polarity of the hazardous transition to generate a modified representation reflecting a modified logic circuit to prevent the hazardous transition from producing a glitch at an output terminal of a logic gate that received the hazardous transition;

the computer storing the modified representation of the modified logic circuit in the memory of the computer; and the computer outputting the modified representation of the logic circuit from the computer.

2. The method of claim 1 wherein determining a transition space includes determining a transition space for truncated local input vectors corresponding to the selected input.

3. The method of claim 1 wherein determining output-transition polarity includes determining, for the selected logic gate, output-transition polarity corresponding to the selected input under the stimulus.

4. The method of claim 1 wherein selecting a logic gate and a stimulus to apply comprises selecting the logic gate from the plurality of interconnected logic gates and selecting the stimulus from one or more stimuli that are possible for the selected logic gate in the initial representation.

5. The method of claim 1 the identifying further comprising:
the computer selecting the logic gate from the plurality of interconnected logic gates;
the computer selecting the stimulus from one or more stimuli that are possible for the selected logic gate in the initial representation;
the computer identifying one or more inputs of the selected logic gate that undergo a transition under the stimulus; and
the computer determining whether at least one of the identified one or more inputs receives a hazardous transition under the selected stimulus.

6. The method of claim 1 wherein the identifying inputs that undergo a transition from the stimulus to determine which inputs receive a hazardous transition includes identifying one or more inputs of the selected logic gate that undergo the transition under the selected stimulus and determining whether at least one of the identified one or more inputs receives the hazardous transition under the selected stimulus.

7. The method of claim 1 wherein the logic circuit is an asynchronous logic circuit.

8. The method of claim 7 further comprising the computer synthesizing the initial representation using a circuit-synthesis tool for synchronous logic circuits.

9. The method of claim 8 wherein logic gates for the synthesis are selected from a set consisting of linearly separable logic gates.

10. The method of claim 1 wherein the logic circuit is a synchronous logic circuit.

11. The method of claim 1 further comprising the computer implementing the processing, identifying, and modifying multiple times to modify previously modified representations of the logic circuit.

12. The method of claim 1 wherein modifying includes determining an initial state of the hazardous transition and determining the transition polarity based on the initial state.

13. The method of claim 12 wherein if the initial state is a binary zero, then the modifying includes inserting additional logic corresponding to a logical conjunction of a local input having the hazardous transition and an inverted Euclidean cube of global input vectors corresponding to the hazardous transition, and, if the initial state is a binary one, then alternatively the modifying includes inserting additional logic corresponding to a logical disjunction of the local input and a Euclidean cube of the global input vectors.

14. The method of claim 12 wherein if the initial state is a binary zero, then the modifying includes inserting additional logic corresponding to a logical conjunction of a local input having the hazardous transition and an inverted Euclidean cube of global input vectors corresponding to the hazardous transition, and, if the initial state is a binary one, then alternatively the modifying includes inserting additional logic corresponding to a logical disjunction of the local input and a Euclidean cube of the global input vectors.

15. The method of claim 14 further comprising the computer determining a transition space corresponding to the global input vectors, the additional logic thereby uses inputs corresponding to the transition space.

16. The method of claim 14 wherein modifying further includes optimizing a portion of the logic circuit corresponding to the inserted additional logic.

17. The method of claim 14 wherein the logic gates of the inserted logic are selected from a set consisting of linearly separable logic gates.

18. The method of claim 1 wherein the modifying includes determining an initial state of the hazardous transition and determining the transition polarity based on the initial state.

19. A computer-implemented method of generating a representation of a logic circuit, the method comprising:
providing an initial representation of a plurality of interconnected logic gates of the logic circuit to a computer having a memory and a processor;
the computer processing the initial representation to select a logic gate and a stimulus and then identifying inputs of the logic gate that undergo a transition from the stimulus to determine whether the input of the logic gate receives a hazardous transition;
the computer modifying the initial representation to create a modified representation of the logic circuit by inserting a logical conjunction of a local input having the hazardous transition and processed global input vectors when the initial state of the hazardous transition is a binary zero, and alternatively, inserting a logical disjunction of the local input and processed global input vectors when the initial state of the hazardous transition is a binary one;
storing the modified representation of the logic circuit in a memory of the computer; and
outputting the modified representation of the logic circuit from the computer.

20. The method of claim 19 wherein modifying further includes modifying the initial representation of the logic circuit based on transition polarity of the hazardous transition to generate a modified representation reflecting a modified logic circuit to prevent the hazardous transition from producing a glitch at an output terminal of a logic gate that received the hazardous transition.

21. The method of claim 19 wherein processing the initial representation to select a logic gate and a stimulus comprises selecting a logic gate from the plurality of interconnected logic gates and selecting a stimulus from one or more stimuli that are possible for the logic gate in the initial representation.

22. The method of claim 19 wherein identifying inputs of the logic gate that undergo a transition from the stimulus to determine whether the selected input receives a hazardous transition includes identifying one or more inputs of the logic gate that undergo a transition under the selected stimulus and determining whether at least one of the one or more inputs receives a hazardous transition under the selected stimulus.

23. The method of claim 19 wherein the logic circuit is an asynchronous logic circuit.

24. The method of claim 23 further comprising the computer synthesizing the initial representation using a circuit-synthesis tool for synchronous logic circuits.

25. The method of claim 24 wherein the logic gates for the synthesis are selected from a set consisting of linearly separable logic gates.

26. The method of claim 19 wherein the logic circuit is a synchronous logic circuit.

27. The method of claim 19 further comprising the computer implementing the steps of processing, identifying, and modifying multiple times to modify previously modified representations of the logic circuit.

28. The method of claim 19 further comprising specifying a logic function for the logic circuit, each of the initial and modified representations thereby implementing the logic function.

29. The method of claim 19 further comprising the computer determining a transition space corresponding to the global input vectors so that the additional logic receives inputs corresponding to the transition space.

30. The method of claim 19 wherein modifying further includes optimizing a portion of the logic circuit corresponding to the inserted additional logic.

31. A computer-implemented method of generating a representation of a logic circuit, the method comprising:
   providing an initial representation of the logic circuit to a computer having a memory storing program code and a processor configured to execute the program code;
   the computer processing the initial representation of the logic circuit and identifying a hazardous transition in the initial representation of the logic circuit;
   responsive to identifying a hazardous transition, modifying the initial representation of the logic circuit with the computer to create a modified representation such that, if the initial state of the hazardous transition is a binary zero, then inserting additional logic corresponding to a logical conjunction of a local input having the hazardous transition and processed global input vectors corresponding to the hazardous transition, and if the initial state of the hazardous transition is a binary one, then alternatively inserting additional logic corresponding to a logical disjunction of the local input and processed global input vectors;
   storing the modified representation of the logic circuit in the memory of the computer; and
   outputting the modified representation of the logic circuit from the computer.

32. The method of claim 31 wherein modifying the initial representation of the logic circuit further includes modifying based on transition polarity of the hazardous transition to generate the modified representation reflecting a modified logic circuit to prevent the hazardous transition from producing a glitch at an output terminal of a logic gate that received the hazardous transition.

33. The method of claim 31 wherein the processed global input vectors are formed of an Euclidean cube of the global input vectors.

34. The method of claim 31 wherein the logic circuit is an asynchronous logic circuit.

35. The method of claim 34 further comprising synthesizing the initial representation, with the computer, using a circuit-synthesis tool for synchronous logic circuits.

36. The method of claim 31 wherein the logic circuit is a synchronous logic circuit.

37. The method of claim 31 further comprising the computer implementing the steps of processing, identifying, and modifying multiple times to modify previously modified representations of the logic circuit.

38. The method of claim 31 further comprising specifying a logic function for the logic circuit, each of the initial and modified representations thereby implementing the logic function.

39. The method of claim 31 wherein the initial representation includes a plurality of interconnected logic gates, and the processing and identifying includes inspecting, gate by gate, at least a subset of the plurality of interconnected logic gates.

40. The method of claim 31 further comprising the computer determining transition space corresponding to the global input vectors, the additional logic uses inputs corresponding to the transition space.

41. The method of claim 31 wherein modifying further comprises optimizing a portion of the logic circuit corresponding to the inserted additional logic.

42. The method of claim 31 wherein logic gates of the inserted logic are selected from a set consisting of linearly separable logic gates.

43. A method, performed by a computer, for determining whether an input of a group of inputs for a selected logic gate in a logic circuit receives a hazardous transition due to the input receiving a selected stimulus comprising the following method steps performed by the computer:
   selecting an input to create a selected input from the group of inputs that undergo a transition;
   determining a transition space for truncated local input vectors corresponding to the selected input;
   determining if the transition space is a subset of a control set for the selected logic gate;
   determining for the selected logic gate output-transition polarity corresponding to the selected input receiving the selected stimulus;
   comparing the output-transition polarity and a final output state of the selected logic gate in response to the selected stimulus;
   modifying the initial representation of the logic circuit based on transition polarity of the hazardous transition to generate a modified representation reflecting a modified logic circuit to prevent the hazardous transition from producing a glitch at an output terminal of the selected logic gate that received the hazardous transition;
   storing the modified representation of the modified logic circuit in a memory of the computer; and
   outputting the modified representation of the modified logic circuit from the computer.

44. A method, performed by a computer having a memory, for modifying an initial representation of a logic circuit to prevent the logic circuit from producing a glitch at the output, the method comprising:
   the computer modifying an initial representation of a logic circuit based on an identified hazardous transition to generate a modified representation reflecting a modified logic circuit to prevent the identified hazardous transition from producing a glitch at an output terminal of a logic gate in the logic circuit that received the identified hazardous transition by determining an initial state of the identified hazardous transition and determining the transition polarity based on the initial state;
   the computer inserting additional logic corresponding to a logical conjunction of a local input having the identified hazardous transition and processed global input vectors corresponding to the identified hazardous transition if the initial state of the identified hazardous transition is a binary zero;

the computer inserting additional logic corresponding to a logical disjunction of the local input and processed global input vectors if the initial state of the identified hazardous transition is a binary one;

storing the modified representation of the modified logic circuit in the memory of the computer; and outputting the modified representation of the logic circuit from the computer.

45. The method of claim 44 wherein the processed global input vectors are formed of an Euclidean cube of the global input vectors.

* * * * *